(12) United States Patent
Seman et al.

(10) Patent No.: US 9,872,319 B2
(45) Date of Patent: Jan. 16, 2018

(54) METHOD AND APPARATUS FOR SELECTING AN IP TYPE DURING ROAMING

(71) Applicant: BLACKBERRY LIMITED, Waterloo (CA)

(72) Inventors: Michal Seman, Ottawa (CA); Mark De Abreu, Ottawa (CA); Jean Dolbec, Ottawa (CA); Barry Fraser Yerxa, Ottawa (CA)

(73) Assignee: BLACKBERRY LIMITED, Waterloo (CA)

( * ) Notice: Subject to any disclaimer, the term of this patent is extended or adjusted under 35 U.S.C. 154(b) by 104 days.

(21) Appl. No.: 14/494,070

(22) Filed: Sep. 23, 2014

(65) Prior Publication Data

US 2016/0088662 A1    Mar. 24, 2016

(51) Int. Cl.
*H04W 4/00* (2009.01)
*H04W 76/02* (2009.01)
*H04W 36/14* (2009.01)
*H04W 84/04* (2009.01)
*H04W 80/04* (2009.01)
*H04L 29/12* (2006.01)
*H04W 88/06* (2009.01)

(52) U.S. Cl.
CPC ........... *H04W 76/02* (2013.01); *H04W 36/14* (2013.01); *H04L 61/6086* (2013.01); *H04W 80/045* (2013.01); *H04W 84/042* (2013.01); *H04W 88/06* (2013.01)

(58) Field of Classification Search
USPC .......................................... 455/432.2, 432.1
See application file for complete search history.

(56) References Cited

U.S. PATENT DOCUMENTS

| 2006/0045080 | A1 | 3/2006 | Islam et al. |
| 2007/0274255 | A1* | 11/2007 | Hung ................ H04L 29/12358 370/328 |
| 2008/0039078 | A1* | 2/2008 | Xu ......................... H04H 20/57 455/432.1 |
| 2010/0165947 | A1* | 7/2010 | Taniuchi ............... H04W 36/08 370/331 |
| 2011/0106959 | A1 | 5/2011 | Suciu et al. |

(Continued)

FOREIGN PATENT DOCUMENTS

EP    2661122 A2    11/2013

OTHER PUBLICATIONS

Extended European Search Report dated Jan. 26, 2016 for European Patent Application No. 15184734.0.

*Primary Examiner* — Chuck Huynh
(74) *Attorney, Agent, or Firm* — Perry + Currier Inc.

(57) ABSTRACT

A method and apparatus for selecting a data connection IP (Internet Protocol) type during roaming. At a device a comprising a processor, a memory storing data indicative of radio access technologies and associated internet protocol (IP) types to use under different roaming conditions, and a communication interface, it is determined, using the communication interface, that roaming is occurring and a given radio access technology being used in the roaming is also determined. The data is processed to select an IP type associated with the given radio access technology. Thereafter, the IP type selected is used, during the roaming, in requests to a gateway to a network.

20 Claims, 3 Drawing Sheets

(56) References Cited

U.S. PATENT DOCUMENTS

2013/0102356 A1 4/2013 Shaw
2014/0173123 A1* 6/2014 Graessley ........... H04L 61/6086
709/228

* cited by examiner

METHOD AND APPARATUS FOR SELECTING AN IP TYPE DURING ROAMING

FIELD

The specification relates generally to mobile devices, and specifically to a method and apparatus for selecting an IP (Internet Protocol) type during roaming.

BACKGROUND

The evolution of computers is currently quite active in the mobile device environment. In communicating with gateways with carrier networks during roaming, data connections that are established can be based solely on the technology used in the home network, as generally devices tend to contact gateways in the home network using a roaming network as a data tunnel, however such data connections through the roaming network can be incompatible with older equipment of the roaming network, which can lead to timeouts at the device and/or data connection failures.

BRIEF DESCRIPTIONS OF THE DRAWINGS

For a better understanding of the various implementations described herein and to show more clearly how they may be carried into effect, reference will now be made, by way of example only, to the accompanying drawings in which.

DETAILED DESCRIPTION

Figure 1:
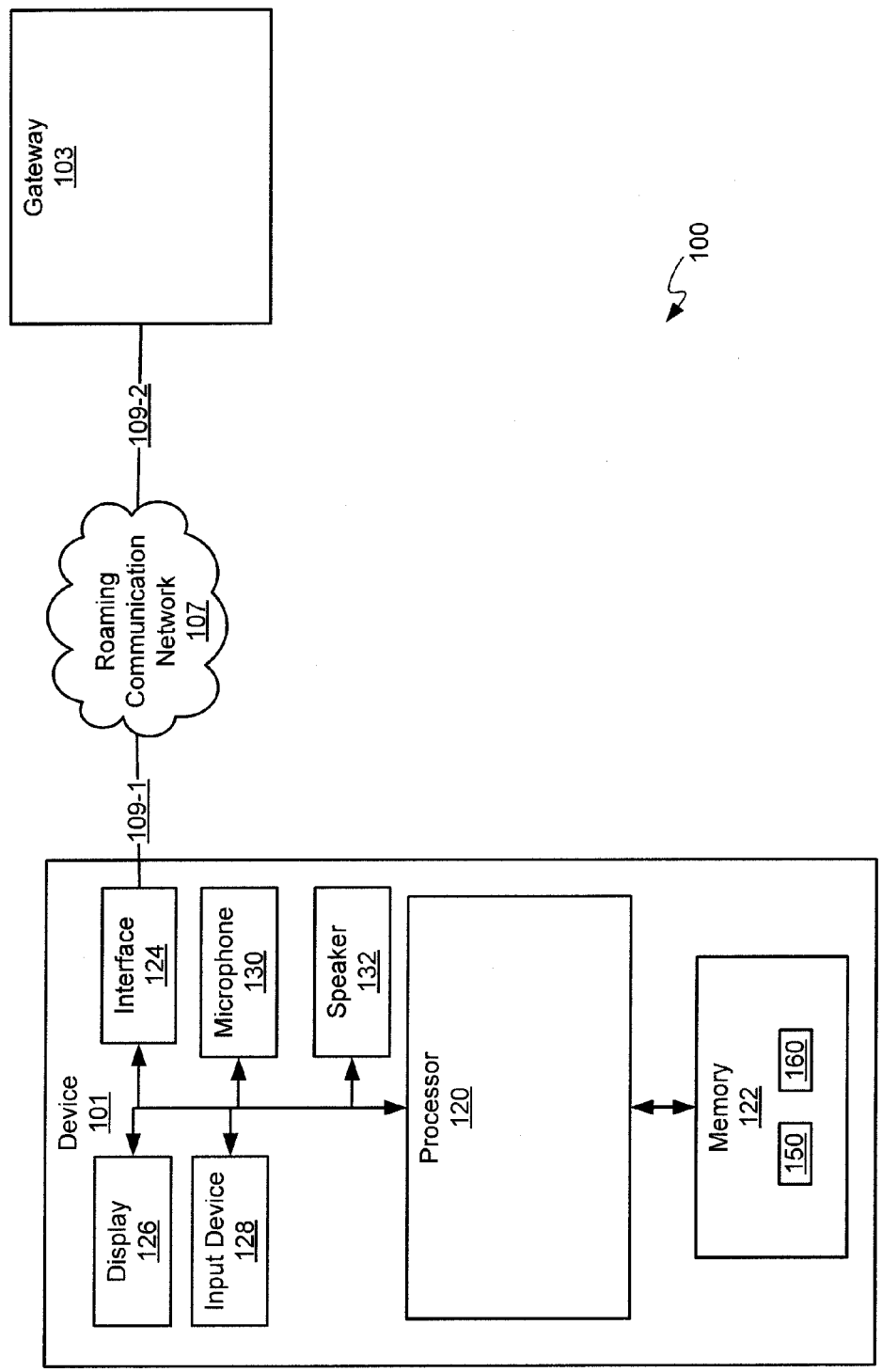
FIG. 1 depicts a system that includes a device for selecting an IP (Internet Protocol) type during roaming, according to non-limiting implementations.

In general, this disclosure is directed to a mobile device which stores in a memory, data specifying an IP (internet protocol) type that the device is to use under roaming conditions for a particular radio access technology ("RAT"). When the device determines that roaming is occurring, for example domestic roaming or international roaming, an IP type associated with a RAT used in the roaming is used in connection request to a gateway. In particular implementations where 3GPP ("3rd Generation Partnership Project") standards are used, carriers can then specify that a PDP (packet data protocol) context be established with a given IP type under roaming conditions as, when a home carrier is configured for use with a current IP type, for example, IPv6 and/or IPv4v6, a roaming carrier may use older equipment that won't recognize PDP context using newer IP types, which leads to time-outs and/or connection failure with the roaming network. This situation is obviated using implementations described in the current specification.

In this specification, elements may be described as "configured to" perform one or more functions or "configured for" such functions. In general, an element that is configured to perform or configured for performing a function is enabled to perform the function, or is suitable for performing the function, or is adapted to perform the function, or is operable to perform the function, or is otherwise capable of performing the function.

It is understood that for the purpose of this specification, language of "at least one of X, Y, and Z" and "one or more of X, Y and Z" can be construed as X only, Y only, Z only, or any combination of two or more items X, Y, and Z (e.g., XYZ, XY, YZ, ZZ, and the like). Similar logic can be applied for two or more items in any occurrence of "at least one . . . " and "one or more . . . " language.

An aspect of the present specification provides a device comprising: a processor, a memory storing data indicative of radio access technologies and associated internet protocol (IP) types to use under different roaming conditions, and a communication interface, the processor configured to: determine, using the communication interface, that roaming is occurring and a given radio access technology being used in the roaming; process the data to select an IP type associated with the given radio access technology; and, thereafter, use the IP type selected in requests to a gateway to a network during the roaming.

The gateway can be identified by an access point name (APN).

The data can be further indicative of gateway configurations, the radio access technologies each associated with one or more of the gateway configurations. The gateway configurations can each represent one or more physical attributes of associated gateways. The one or more physical attributes can comprise associated radio access technologies of the associated gateways, each associated radio access technology in turn being associated with one or more given IP types.

The data can comprise IP types to use while the device is roaming for particular radio access technologies. The data can comprise XML data. The data can be carrier specific. The data can be further indicative of which IP type to use in one or more roaming conditions.

The requests can comprise connect requests transmitted using the IP type selected.

Another aspect of the specification provides a method comprising: determining, using a communication interface of a device, that roaming is occurring and a given radio access technology being used in the roaming, the device comprising a processor, a memory storing data indicative of radio access technologies and associated internet protocol (IP) types to use under different roaming conditions, and the communication interface; processing the data to select an IP type associated with the given radio access technology; and, thereafter, using the IP type selected in requests to a gateway to a network during the roaming.

The gateway can be identified by an access point name (APN).

The data can be further indicative of gateway configurations, the radio access technologies each associated with one or more of the gateway configurations. The gateway configurations can each represent one or more physical attributes of associated gateways. The one or more physical attributes can comprise associated radio access technologies of the associated gateways, each associated radio access technology in turn being associated with one or more given IP types.

The data can comprise IP types to use while the device is roaming for particular radio access technologies. The data can comprise XML data. The data can be carrier specific. The data can be further indicative of which IP type to use in one or more roaming conditions.

The requests can comprise connect requests transmitted using the IP type selected.

Another aspect of the specification provides a method comprising: determining, using a communication interface of a device, that roaming is occurring and a given radio access technology being used in the roaming, the device comprising a processor, a memory storing data indicative of radio access technologies and associated internet protocol (IP) types to use under different roaming conditions, and the communication interface; processing the data to select an IP type associated with the given radio access technology; and, thereafter, using the IP type selected in requests to a gateway to a network during the roaming.

Yet another aspect of the specification provides a computer program product, comprising a computer usable medium having a computer readable program code adapted to be executed to implement a method comprising: determining, using a communication interface of a device, that roaming is occurring and a given radio access technology being used in the roaming, the device comprising a processor, a memory storing data indicative of radio access technologies and associated internet protocol (IP) types to use under different roaming conditions, and the communication interface; processing the data to select an IP type associated with the given radio access technology; and, thereafter, using the IP type selected in requests to a gateway to a network during the roaming. The computer usable medium can comprise a non-transitory computer usable medium.

FIG. 1 depicts a system 100 including a device 101 configured for selecting an IP (Internet Protocol) type during roaming. System 100 comprises a device 101, and a gateway 103 to a network (not depicted), in communication using at least one roaming communication network 107 (interchangeably referred to hereafter as network 107, and different from a network associated with gateway 107), and respective links 109-1, 109-2 (interchangeably referred to hereafter, collectively, as links 109, and generically as a link 109) thereto, according to non-limiting implementations. Device 101 comprises a processor 120 interconnected with a memory 122, a communications interface 124 (interchangeably referred to hereafter as interface 124), a display 126 and an input device 128, optionally a microphone 130 and speaker 132. While not depicted, gateway 103 generally comprises a processor interconnected with a memory and a communication interface.

Memory 122 generally stores data 150 indicative of radio access technologies and associated internet protocol (IP) types to use under different roaming conditions, as described in further detail below.

Furthermore, it is assumed in system 100 that device 101 is roaming from a home network, and hence link 109-1 between device 101 and network 107 is established under roaming conditions, and/or that the link 109-1 is between device 101 and a roaming network. However, gateway 103 generally comprises one or more of a gateway to a network, a gateway to a home network, a gateway to a network associated with device 101, and an access point (e.g. a server providing a service to device 101 that can be located in a home network, and the like). Indeed, in particular non-limiting implementations, gateway 103 can be identified using an access point name (APN).

As will be explained in detail below, device 101 is generally configured to: determine, using communication interface 124, that roaming is occurring and a given radio access technology being used in the roaming; process data 150 to select an IP type associated with the given radio access technology; and, thereafter, use the IP type selected in requests to 130 gateway to a network during the roaming.

Links 109 comprises any suitable links for enabling device 101 and gateway 103 to communicate using network 107. Links 109 can hence each include any suitable combination of wired and/or wireless links, wired and/or wireless devices and/or wired and/or wireless networks, including but not limited to any suitable combination of USB (universal serial bus) cables, serial cables, wireless links, cell-phone links, cellular network links (including but not limited to 2G, 2.5G, 3G, 4G+, and the like) wireless data, Bluetooth™ links, NFC (near field communication) links, WiFi links, WiMax links, packet based links, the Internet, analog networks, the PSTN (public switched telephone network), WiFi access points, and the like, and/or a combination. In particular, links 109 and network 107 can comprise a data tunnel between device 101 and gateway 103.

Device 101 can be any type of electronic device that can be used in a self-contained manner. Device 101 includes, but is not limited to, any suitable combination of electronic devices, communications devices, computing devices, personal computers, laptop computers, portable electronic devices, mobile computing devices, portable computing devices, tablet computing devices, laptop computing devices, desktop phones, telephones, PDAs (personal digital assistants), cellphones, smartphones, e-readers, internet-enabled appliances and the like. Other suitable devices are within the scope of present implementations.

FIG. 1 further depicts a schematic diagram of device 101 according to non-limiting implementations. It should be emphasized that the structure of device 101 in FIG. 1 is purely an example, and contemplates a device that can be used for both wireless voice (e.g. telephony) and wireless data communications (e.g. email, web browsing, text, and the like). However, while FIG. 1 contemplates a device that can be used for telephony and/or messaging, in other implementations, device 101 can comprise a device configured for implementing any suitable specialized functions, including but not limited to one or more of telephony, messaging, computing, appliance, and/or entertainment related functions.

Device 101 comprises at least one input device 128 generally configured to receive input data, and can comprise any suitable combination of input devices, including but not limited to a keyboard, a keypad, a pointing device, a mouse, a track wheel, a trackball, a touchpad, a touch screen and the like. Other suitable input devices are within the scope of present implementations. In specific non-limiting implementations described herein, input device 128 comprises a touch screen for receiving touch input data.

Input from input device 128 is received at processor 120 (which can be implemented as a plurality of processors, including but not limited to one or more central processors (CPUs) and/or one or more processing units; either way, processor 120 comprises a hardware element of device 101). Processor 120 is configured to communicate with memory 122 comprising a non-volatile storage unit (e.g. Erasable Electronic Programmable Read Only Memory ("EEPROM"), Flash Memory) and a volatile storage unit (e.g. random access memory ("RAM")). Programming instructions that implement the functional teachings of device 101 as described herein are typically maintained, persistently, in memory 122 and used by processor 120 which makes appropriate utilization of volatile storage during the execution of such programming instructions. Those skilled in the art recognize that memory 122 is an example of computer readable media that can store programming instructions executable on processor 120. Furthermore, memory 122 is also an example of a memory unit and/or memory module.

In particular, memory 122 stores an application 160 that, when processed by processor 120, enables processor 120 to: determine, using communication interface 124, that roaming is occurring and a given radio access technology being used in the roaming; process data 150 to select an IP type associated with the given radio access technology; and, thereafter, use the IP type selected in requests to gateway 150 to a network during the roaming. Furthermore, application 160 is an example of programming instructions stored at memory 122.

Processor 120 can also be configured to communicate with a display 126, and optionally a microphone 130 and a speaker 132. Display 126 comprises any suitable one of or combination of CRT (cathode ray tube) and/or flat panel displays (e.g. LCD (liquid crystal display), plasma, OLED (organic light emitting diode), capacitive or resistive touch screens, and the like). When display 126 comprises a touch screen, display 126 and input device 128 are combined into one apparatus. Microphone 130, when present, comprises any suitable microphone for receiving sound data. Speaker 132, when present, comprises any suitable speaker for providing sound data, audible alerts, audible communications from remote communication devices, and the like, at device 101.

In some implementations, input device 128 and display 126 are external to device 101, with processor 120 in communication with each of input device 128 and display 126 via a suitable connection and/or link.

Processor 120 also connects to interface 124, which can be implemented as one or more radios and/or connectors and/or network adaptors, configured to communicate with network 107 via link 109-1. In general, interface 124 is configured to correspond with the network architecture that is used to implement link 109-1, as described above. In other implementations a plurality of links with different protocols can be employed and thus interface 124 can comprise a plurality of interfaces to support each link. Regardless, interface 124 is configured to establish a roaming data connection with network 107 using one or more links 109. Indeed, any suitable combination of interfaces is within the scope of present implementations.

While not depicted, device 101 further comprises a power source, for example a connection to a battery, a power pack and the like and/or a connection to a main power supply and a power adaptor (e.g. an AC-to-DC (alternating current to direct current) adaptor, and the like), which can be used to power device 101 and/or charge a battery and the like.

Further, it should be understood that in general a wide variety of configurations for device 101 are contemplated.

Gateway 103 generally comprises a server of a home network, gateway 103 generally configured to provide a service to device 101 via links 109 and network 107. Gateway 103 can be based on any well-known server environment including a module that houses one or more central processing units, volatile memory (e.g. random access memory), persistent memory (e.g. hard disk devices) and network interfaces to allow gateway 103 to communicate over link 109-2. For example, gateway 103 can be a Sun Fire V480 running a UNIX operating system, from Sun Microsystems, Inc. of Palo Alto Calif., and having four central processing units each operating at about nine-hundred megahertz and having about sixteen gigabytes of random access memory. However, it is to be emphasized that this particular server is merely exemplary, and a vast array of other types of computing environments for gateway 103 are contemplated.

For example, gateway 103 can comprise any suitable number of gateways (i.e. servers) that can perform different functionality of gateway implementations described herein. For example, one or more gateways can provide a service for general data applications (browse applications, email applications, attachment applications), while other gateways can provide other types of services, including, but not limited to, SMS (short message service) services, MMS (multimedia message service) services, mobile hotspot services, carrier administration services, and the like.

In particular non-limiting implementations, gateway 103 can comprise one or more access points used in establishing a data connection, for example, with a network that is not the roaming network including, but not limited to, a non-roaming network, a home network, a home carrier network, a network used by device 101 when device 101 is not roaming, and the like.

Figure 2:
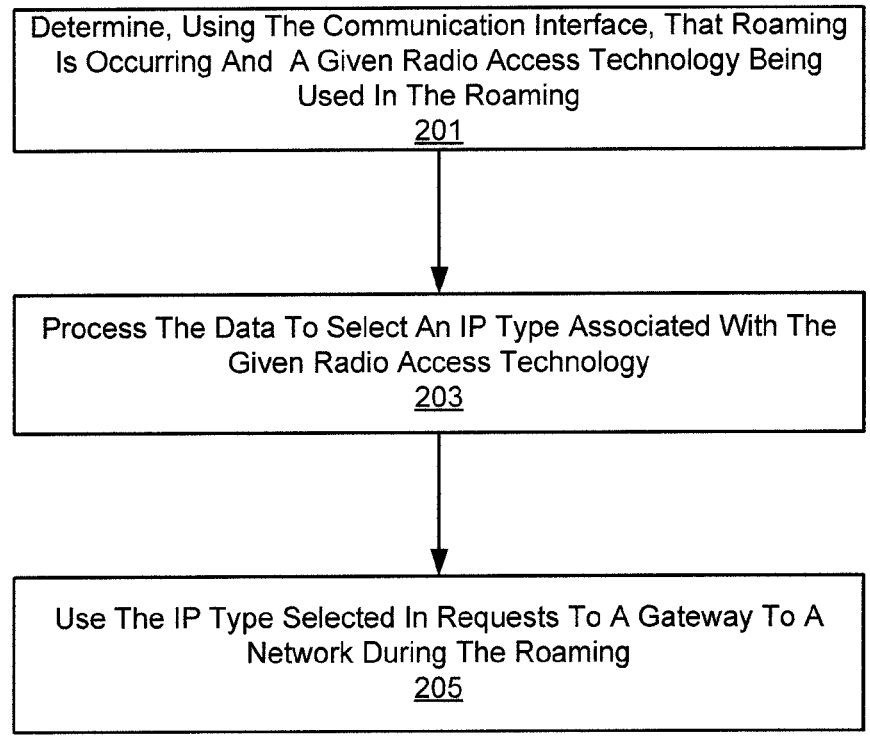
FIG. 2 depicts a method for selecting an IP (Internet Protocol) type during roaming, according to non-limiting implementations.

Attention is now directed to FIG. 2 which depicts a flowchart of a method 200 for selecting an IP (Internet Protocol) type during roaming, according to non-limiting implementations. In order to assist in the explanation of method 200, it will be assumed that method 200 is performed using system 100, and specifically by processor 120 of device 101, for example when processor 120 processes application 160. Indeed, method 200 is one way in which device 101 can be configured. Furthermore, the following discussion of method 200 will lead to a further understanding of device 101, and system 100 and its various components. However, it is to be understood that system 100 and/or method 200 can be varied, and need not work exactly as discussed herein in conjunction with each other, and that such variations are within the scope of present implementations.

Regardless, it is to be emphasized, that method 200 need not be performed in the exact sequence as shown, unless otherwise indicated; and likewise various blocks may be performed in parallel rather than in sequence; hence the elements of method 200 are referred to herein as "blocks" rather than "steps". It is also to be understood, however, that method 200 can be implemented on variations of system 100 as well.

At block 201, processor 120 determines, using communication interface 124, that roaming is occurring and a given radio access technology being used in the roaming. At block 203, processor 120 processes data 150 to select an IP type associated with the given radio access technology. After block 203, at block 205, processor 120 uses the IP type selected in requests to gateway 103 to a network during the roaming.

For example, data 150 can comprise an XML table that is provisioned at device 101 by an associated home carrier; indeed, in non-limiting implementations, data 150 can be stored at a SIM (subscriber identity module and/or subscriber identification module) card received at device 101 when device 101 is configured for use with home carrier. Data 150 can be updated periodically and/or from time-to-time by receiving updated data from a server associated with the home carrier via interface 124, and/or when an administrator of the home carrier determines that data 150 is to be updated.

Method 200 will now be described with respect to specific non-limiting implementations of forcing device 101 to use IPv4 type configurations when roaming. For example, device 101 can be configured to communicate with gateway 103 using IPv6 and/or IPv4v6 when device 101 is not roaming, for example communicating with gateway 103 on a home network. However, when device 101 is roaming, communication with gateway 103 using IPv6 and/or IPv4v6 can lead to failures in data connections between device 101 and network 107 when network 107 is not configured to communicate using IPv6 and/or IPv4v6. In other words, when device 101 is not provisioned with data 150, when device 101 roams, and attempts to communicate with gateway 103, device 101 will use a same IP data type configuration that device 101 would use to communicate with gateway 103 on a home network; in other words, without data 150, device 101 uses a same IP data type to attempt to communicate with gateway 103 regardless of whether device 101 is roaming or not roaming.

Indeed, method 200 represents dynamic IP type configuration based on cellular data roaming status and a type or RAT used in request from device 101 to gateway 103. For example, gateway 103 can be RAT specific in that when device 101 is on an LTE network and/or using an LTE link with a network, device 101 can contact gateway 103.

Data 150 can comprise one or more of XML (extensible mark-up language) data and/or an XML table that is generally used to configure device 101 for a home network.

Furthermore, data 150 can include an update to an XML schema used to configure device. Specifically, a "roaming filter" can be added as an element to each IP configuration defined in an XML table of specific non-limiting implementations, with an IP type defined in an "IPConfiguration" that is valid when both a current RAT and a current roaming filter apply. When an IP configuration does not specify a roaming filter, the IP type used by device 101 is valid for any roaming type (e.g. in a generic configuration).

It is further assumed that the XML table is constructed unambiguously, such that no more than one IP type will always be applicable for a given combination of RAT and roaming filter (roaming status and type) combination (e.g. one applicable IP type for UMTS roaming, one for UMTS not roaming, one applicable IP type for LTE roaming, one for LTE not roaming, etc.).

It is further assumed that in the XML schema described herein that, when a service is loaded at device 101 for the first time, processor 120 of device 101:

a. Makes a list of all IP types defined by data 150;
 b. Evaluates a current roaming status (roaming/not roaming) and type (e.g. none/domestic/off campus/international); and,
 c. For each defined RAT eliminate inapplicable IP types.

The end result is a dynamically created configuration with one IP type per RAT (e.g. data 150 comprises data indicative of RATs and associated internet protocol (IP) types to use under different roaming conditions).

It is further assumed in the XML schema described herein that when a notification is received at device 101 indicates a change in roaming state (e.g. at block 201, device 101 can determine that roaming is occurring by communicating with network 107 to determine a network name, and whether the network name is a home network or not;

indeed, camping techniques used in roaming are within the scope of present implementations), is received, processor 120 of device 101:

a. Refers to the original list of all defined IP types (i.e. data 150);
 b. Determines that roaming is occurring (i.e. whether a roaming filter is passed as per an XML definition stored in data 150);

c. Dynamically create a configuration of one IP type per RAT, which can be different from the configuration before a roaming state change; and,
 d. When the new configuration is different, apply it.

A non-limiting example of data 150 is provided hereafter in form of an XML table:

```
<xs:simpleType name="RadioRoamingStatus_e"> <!-- possible roaming states -->
   <xs:restriction base="xs:string">
      <xs:enumeration value="Unknown"/>
      <xs:enumeration value="NotRoaming"/>
      <xs:enumeration value="Roaming"/>
   </xs:restriction>
</xs:simpleType>
<xs:simpleType name="RadioRoamingType_e"> <!-- currently defined roaming types, which can be defined by carriers -->
   <xs:restriction base="xs:string">
      <xs:enumeration value="None"/>
      <xs:enumeration value="OffCampus"/>
      <xs:enumeration value="Domestic"/>
   </xs:restriction>
</xs:simpleType>
<xs:complexType name="RadioRoamingFilter_t">
   <xs:sequence>
      <xs:element name="Status" type="RadioRoamingStatus_e" minOccurs="1" maxOccurs="1"/> <!-- mandatory part of roaming filter -->
      <xs:element name="Type" type="RadioRoamingType_e" minOccurs="0" maxOccurs="8"/> <!-- optional part of roaming filter -->
   </xs:sequence>
</xs:complexType>
<xs:complexType name="IPConfiguration_t">
   <xs:sequence>
      ...
      <xs:element name="RadioRoamingFilter" type="RadioRoamingFilter_t" minOccurs="0" maxOccurs="8"/> <!-- roaming filter is optional for an IP configuration -->
      <xs:element name="Type" type="IPType_t" />
      ...
   </xs:sequence>
</xs:complexType>
<!-- The following says: For internet service use IPv4 when roaming on a 3GPP type network; use IPv4v6 otherwise -->
<CarrierDataConfiguration version="1.0.0.0">
<Name>CARRIER NAME</Name>
   ...
<ServiceConfiguration>
<Name>internet</Name>
...
<IPConfiguration> <!-- This applies to all "3GPP" RATS (UMTS and GSM), but only when roaming -->
      <NetworkServiceFilter>3GPP</NetworkServiceFilter>
      <RadioRoamingFilter>
         <Status>Roaming</Status>
      </RadioRoamingFilter>
      <Type>IPv4</Type>
   </IPConfiguration>
      <IPConfiguration> <!-- This applies to all RATS, 3GPP and otherwise, for any roaming state -->
         <Type>IPv4v6</Type>
      </IPConfiguration>
   ...
</ServiceConfiguration>
</CarrierDataConfiguration>
```

In general, the XML table provided above, when processed by processor 120 of device 101, causes device 101 to use IPv4 for internet service use when roaming on a 3GPP type network, and use IPv4v6 otherwise.

Similarly, in a non-limiting example of a tethering service, where domestic roaming occurs on a 3GPP network will use IPv4, off campus roaming on 3GPP network will use IPv6, everything else IPv4v6:

```xml
<CarrierDataConfiguration version="1.0.0.0">
    <Name>CARRIER NAME</Name>
    ...
    <ServiceConfiguration>
        <Name>tethering</Name>
        ...
        <IPConfiguration>
            <NetworkServiceFilter>3GPP</NetworkServiceFilter>
            <RoamingFilter>
                <Status>Roaming</Status>
                <Type>Domestic</Type>
            </RoamingFilter>
            <Type>IPv4</Type>
            ...
        </IPConfiguration>
        <IPConfiguration>
            <NetworkServiceFilter>3GPP</NetworkServiceFilter>
            <RoamingFilter>
                <Status>Roaming</Status>
                <Type>OffCampus</Type>
            </RoamingFilter>
            <Type>IPv6</Type>
            ...
        </IPConfiguration>
        <IPConfiguration>
            <Type>IPv4v6</Type>
            ...
        </IPConfiguration>
        ...
    </ServiceConfiguration>
    ...
</CarrierDataConfiguration>
```

However, the above examples of XML tables are provided as examples only, and other types of data 150 are within the scope of present implementations. For example, data 150 can comprise a table and/or a list and/or a database file, and the like, that can optionally be arranged in rows and columns, indicating associations between radio access technologies and IP types to use when a given radio access technology is being used under different roaming conditions.

Furthermore, data 150 and/or the XML data, can be overlaid with data from other sources. For example, in some implementations device 101 can include a user interface ("UI") that allows information in data 150 to be customized, then an XML data overlay would be applied to a carrier XML file on device 101 so that user input has a higher precedence than other data in the XML file; for example, device 101 can receive input at input device 128 that specifies which IP type to use in given roaming conditions, including, but not limited to, which IP type to use for a given RAT. Other sources of overlaid data can include, but is not limited to, data received from an OMADM (Open Mobile Alliance (OMA) Device Management (DM), a device management protocol) server, engineering UIs, other user interfaces, other servers, and the like.

In some implementations, once an IP type is selected based on a RAT used in a data connection (block 203), requests to gateway 103 (of block 205) can comprise connect requests transmitted using the IP type selected, for example, to establish communications with gateway 103. In particular non-limiting implementations, the connect requests can comprise PDP (packet data protocol) connect requests, for example, in implementations where 3GPP is used.

Furthermore, data 150 can be organized in any suitable manner. For example, data 150 can be further indicative of gateway name configurations, the radio access technologies in data 150 each associated with one or more of the gateway configurations. In other words, data 150 can comprise gateway configurations, for example categorized and/or organized according to names of each gateway which device 101 can communicate with, including gateway 103. The gateway configurations can each represent one or more physical attributes of associated gateways, for example a type of radio access technology to be used with each gateway. In other words, the one or more physical attributes stored in data 150, in these implementations, can comprise associated radio access technologies of the associated gateways, each associated radio access technology in turn being associated with one or more given IP types.

Put another way, data 150 comprises IP types to use while device 101 is roaming for particular radio access technologies and/or data 150 is indicative of which IP type to use in one or more roaming conditions.

In present implementations data 150 can be carrier specific. In other words, data 150 can comprise an identifier of a home carrier with which device 101 is associated. When device 101 is associated with more than one home carrier (e.g. in multi-SIM card devices), device 101 can store more than one set of data 150, one for each carrier with which device 101 is associated. For example, device 101 can comprise one configuration (XML) table per carrier.

Furthermore, present implementations include one or more services per configuration, so that each set of data 150 can specify more than one gateway name and/or access point name (APN, i.e. when gateway 103 comprises an access point as described above) and one or more RATs associated therewith. Indeed, each service can comprise one gateway name and/or APN per RAT, though a gateway name and/or an APN can be the same for all RATs, but different gateway names and/or APNs for different RATs are also within the scope of present implementations. Indeed, more than one service can have the same gateway name and/or APN, for one or more of their associated RATs.

When a RAT is not defined in data 150, the IP configuration selected is applicable to all RATs; and when a roaming filter is not defined in data 150, the IP configuration is applicable to all roaming states and types. In some of these implementations, a first IP type found in a list of IP types can then be applicable to both a current RAT and a current roaming state (status and type) for a service and/or gateway and/or APN. This places several expectations on defining data 150 (including, but not limited to a service (XML) table): 1) when more than one IP types are incorrectly defined that can satisfy all filters, the first one will "win"; and, 2) when more than one service can use the same gateway name and/or APN, then data 150 should define the same IP types for the same intersect of filters, otherwise the last service configuration applied would override the previous ones.

Figure 3:
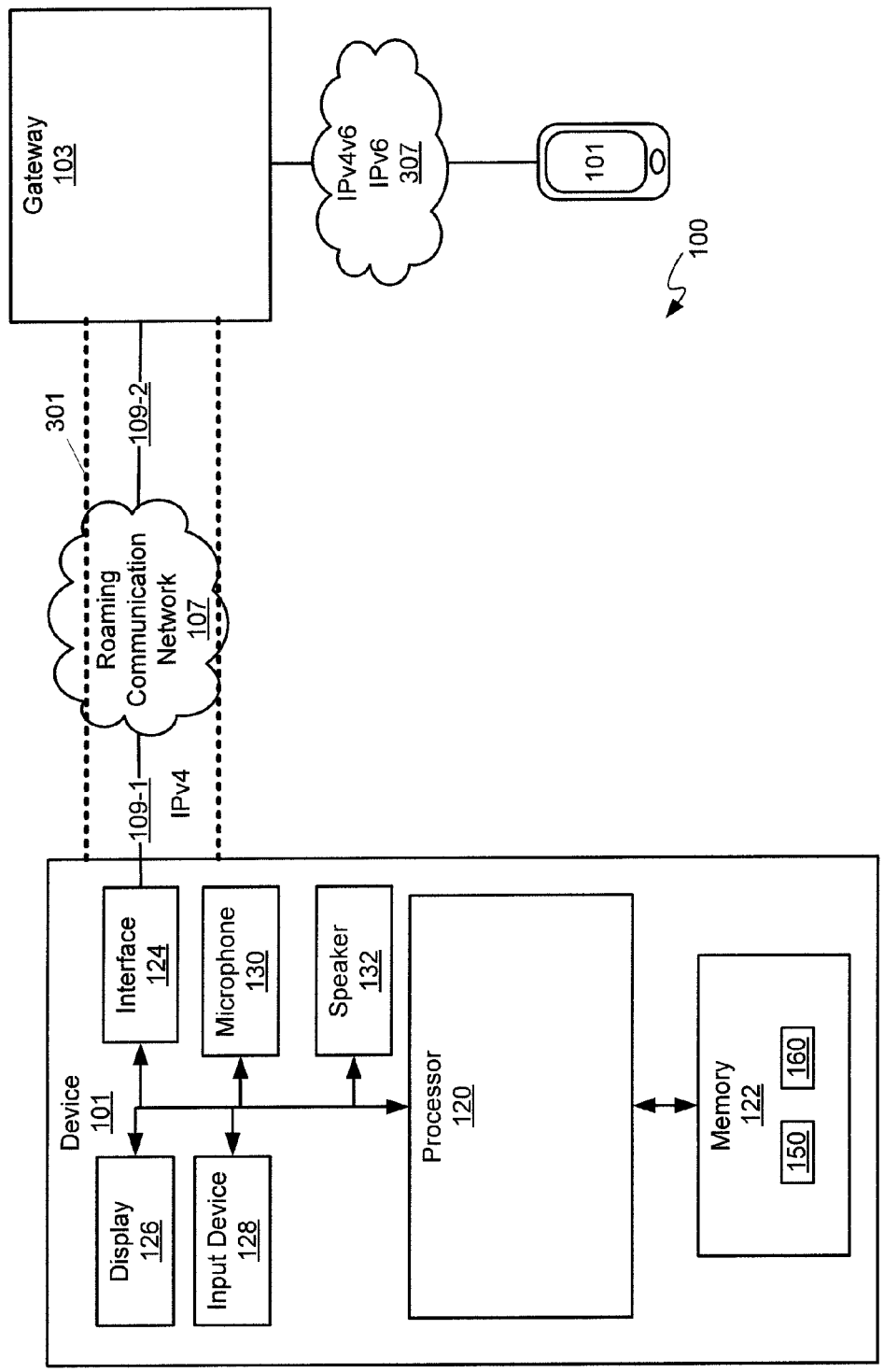
FIG. 3 depicts the method of FIG. 1 after a data connection has been established to a gateway through a roaming network, and alternatively when a data connection has been established to a gateway through a home network, according to non-limiting implementations.

In any event, attention is next directed to FIG. 3, which is substantially similar to FIG. 1, with like elements having like numbers. Specifically, FIG. 3 shows device 101 in communication with gateway 103 using an IPv4 data tunnel 301 when device 101 is roaming using network 107 that has been established after method 200 is implemented at device 101. However, FIG. 3 also depicts a representation of device 101 in communication with gateway 103 using a home carrier network 307 using one or more of an IPv4v6 and an IPv6 configuration. Hence, when device 101 is roaming, device 101 uses a different IP type to communicate with gateway 103 than when device 101 is not roaming. For example, when device 101 is roaming, device 101 can use an older IP type than when device 101 is not roaming. The older IP type selected is generally based on the RAT used in the data connection with network 107. In each scenario, gateway 103 acts as a gateway to a network to provide a service to device 101, as described above. The network to which gateway 103 is providing access can comprise network 307, but can also comprise a different network.

Persons skilled in the art will appreciate that there are yet more alternative implementations and modifications possible. For example, while certain examples have been described herein with respect to PDP context, which can be 3GPP specific, method 200 can be implemented where other standards are used in a network. For example, when LTE are used in a network, method 200 can be applied to Evolved Packet System (EPS) bearers, using associated data structures and IP types to define relationships between RATs and IP types within data 150.

Hence, provided herein is a method and apparatus for selecting an IP (Internet Protocol) type during roaming, where RAT types play a role of a filter similar to a roaming filter for IP types. In other words, selection of an IP type is based on a logical intersection of RAT type and a roaming filter, so that, when a device is roaming, an IP type is based on a RAT used in the communications.

Those skilled in the art will appreciate that in some implementations, the functionality of device 101 can be implemented using pre-programmed hardware or firmware elements (e.g., application specific integrated circuits (ASICs), electrically erasable programmable read-only memories (EEPROMs), etc.), or other related components. In other implementations, the functionality of devices 101 can be achieved using a computing apparatus that has access to a code memory (not shown) which stores computer-readable program code for operation of the computing apparatus. The computer-readable program code could be stored on a computer readable storage medium which is fixed, tangible and readable directly by these components, (e.g., removable diskette, CD-ROM, ROM, fixed disk, USB drive). Furthermore, the computer-readable program can be stored as a computer program product comprising a computer usable medium. Further, a persistent storage device can comprise the computer readable program code. The computer-readable program code and/or computer usable medium can comprise a non-transitory computer-readable program code and/or non-transitory computer usable medium. Alternatively, the computer-readable program code could be stored remotely but transmittable to these components via a modem or other interface device connected to a network (including, without limitation, the Internet) over a transmission medium. The transmission medium can be either a non-mobile medium (e.g., optical and/or digital and/or analog communications lines) or a mobile medium (e.g., microwave, infrared, free-space optical or other transmission schemes) or a combination thereof.

A portion of the disclosure of this patent document contains material which is subject to copyright protection. The copyright owner has no objection to the facsimile reproduction by any one of the patent document or patent disclosure, as it appears in the Patent and Trademark Office patent file or records, but otherwise reserves all copyrights whatsoever.

Persons skilled in the art will appreciate that there are yet more alternative implementations and modifications possible, and that the above examples are only illustrations of one or more implementations. The scope, therefore, is only to be limited by the claims appended hereto.

What is claimed is:

1. A device comprising:
   a processor, a memory storing data indicative of which IP (internet protocol) types to use in given roaming conditions to access a gateway to a home network through a roaming network, including a given IP type to use for a given cellular radio access technology type, and a communication interface, the processor configured to:
   determine, using the communication interface, a cellular data roaming status indicating that roaming is occurring, a roaming type, and a particular cellular radio access technology type being used in a connection through the roaming network to the gateway to the home network in the roaming;
   process the data to select the given IP type associated with the particular cellular radio access technology type, selection of the given IP type based only on the cellular data roaming status, the cellular data roaming type, and the particular cellular radio access technology type, the given IP type different from an IP type used to access the gateway under non-roaming conditions; and, thereafter,
   use the given IP type selected in requests to the gateway to the home network during the roaming, the requests transmitted to the roaming network.

2. The device of claim 1, wherein the gateway is identified by an access point name (APN).

3. The device of claim 1, wherein the data is further indicative of gateway configurations, the cellular radio access technology types each associated with one or more of the gateway configurations.

4. The device of claim 3, wherein the gateway configurations each represent one or more physical attributes of associated gateways.

5. The device of claim 4, wherein the one or more physical attributes comprise associated cellular radio access technology types of the associated gateways, each associated cellular radio access technology in turn being associated with one or more given IP types.

6. The device of claim 1, wherein the data comprises XML data.

7. The device of claim 1, wherein the data is carrier specific.

8. The device of claim 1, wherein the data is further indicative of which IP type to use in one or more roaming conditions.

9. The device of claim 1, wherein the request comprises connect requests transmitted using the IP type selected.

10. The device of claim 1, wherein the processor is further configured to: determine, using the communication interface, the cellular data roaming status by receiving, from the roaming network, a notification of a change in roaming state.

11. A method comprising:
    determining, using a communication interface of a device, a cellular data roaming status indicating that roaming is occurring, a cellular data roaming type and a particular cellular radio access technology type being used in a connection with a gateway to a home network, through a roaming network, in the roaming, the device comprising a processor, a memory storing data indicative of which IP (internet protocol) types to use in given roaming conditions to access the gateway to the home network through the roaming network, including a given IP type to use for a given cellular radio access technology type, and the communication interface;
    processing the data to select the given IP type associated with the particular cellular radio access technology type, selection of the given IP type based only on the cellular data roaming status, the cellular data roaming type, and the particular cellular radio access technology type, the given IP type different from an IP type used to access the gateway under non-roaming conditions; and, thereafter, using the given IP type selected in requests to the gateway to the home network during the roaming, the requests transmitted to the roaming network.

12. The method of claim 11, wherein the gateway is identified by an access point name (APN).

13. The method of claim 11, wherein the data is further indicative of gateway configurations, the cellular radio access technology types each associated with one or more of the gateway configurations.

14. The device of claim 13, wherein the gateway configurations each represent one or more physical attributes of associated gateways.

15. The device of claim 14, wherein the one or more physical attributes comprise associated cellular radio access technologies types of the associated gateways, each associated cellular radio access technology type in turn being associated with one or more given IP types.

16. The method of claim 11, wherein the data comprises XML data.

17. The method of claim 11, wherein the data is further indicative of which IP type to use in one or more roaming conditions.

18. The method of claim 11, wherein the cellular data roaming status is determined by receiving, from the roaming network, a notification of a change in roaming state.

19. A non-transitory computer usable medium storing a computer program, wherein execution of the computer program is for:

determining, using a communication interface of a device, a cellular data roaming status indicating that roaming is occurring, a cellular data roaming type, and a particular cellular radio access technology type being used in a connection with a gateway to a home network, through a roaming network, in the roaming, the device comprising a processor, a memory storing data indicative of which IP (internet protocol) types to use in given roaming conditions to access the gateway to the home network through the roaming network, including a given IP type to use for a given cellular radio access technology type, and the communication interface;

processing the data to select the given IP type associated with the particular cellular radio access technology type, selection of the given IP type based only on the cellular data roaming status, the cellular data roaming type, and the particular cellular radio access technology type, the given IP type different from an IP type used to access the gateway under non-roaming conditions; and, thereafter, using the given IP type selected in requests to the gateway to the home network during the roaming, the requests transmitted to the roaming network.

20. The non-transitory computer usable medium of claim 19, wherein execution of the computer program is for further for: determining, using the communication interface, the cellular data roaming status by receiving, from the roaming network, a notification of a change in roaming state.

* * * * *